United States Patent
Walker et al.

[11] Patent Number: 5,933,609
[45] Date of Patent: Aug. 3, 1999

[54] METHOD AND SYSTEM FOR HOT DOCKING A PORTABLE COMPUTER TO A DOCKING STATION VIA THE PRIMARY PCI BUS

[75] Inventors: Gary Walker, Phoenix; Franklyn H. Story, Chandler; David Evoy, Tempe; Michael Crews, Phoenix; Peter Chambers, Scottsdale, all of Ariz.

[73] Assignee: VLSI Technology, Inc., San Jose, Calif.

[21] Appl. No.: 08/629,015

[22] Filed: Apr. 8, 1996

[51] Int. Cl.⁶ .................................................. G06F 13/00
[52] U.S. Cl. .......................... 395/281; 395/293; 395/800; 395/750.01
[58] Field of Search .................................. 395/281, 800, 395/671, 750, 294; 327/293; 361/686, 683; 364/514 R

[56] References Cited

U.S. PATENT DOCUMENTS

| | | | |
|---|---|---|---|
| 5,347,425 | 9/1994 | Herron et al. | 361/683 |
| 5,396,400 | 3/1995 | Register et al. | 361/686 |
| 5,463,742 | 10/1995 | Kobayashi | 395/281 |
| 5,488,572 | 1/1996 | Belmont | 364/514 R |
| 5,526,493 | 6/1996 | Shu | 395/281 |
| 5,596,728 | 1/1997 | Belmont | 395/281 |
| 5,598,537 | 1/1997 | Swanstrom et al. | 395/281 |
| 5,598,539 | 1/1997 | Gephardt et al. | 395/281 |
| 5,625,829 | 4/1997 | Gephardt et al. | 395/800 |
| 5,632,020 | 5/1997 | Gephardt et al. | 395/283 |
| 5,664,118 | 9/1997 | Nishigaki et al. | 395/283 |
| 5,798,951 | 8/1998 | Cho et al. | 364/708.1 |

*Primary Examiner*—Ayaz R. Sheikh
*Assistant Examiner*—Eric S. Thlang
*Attorney, Agent, or Firm*—Wagner, Murabito&Hao

[57] ABSTRACT

A portable computer and corresponding docking station, where the portable computer may be inserted into or removed from the docking station without concern relating to the state of either the portable computer or of the docking station. The hot docking sequence is performed by establishing a direct connection to the primary PCI bus without the risk of any possible system damage, file damage, or data loss. This can be accomplished even while the portable computer system is powered on and is actively running. The present invention prevents glitches from occurring in pre-existing pins and adds four new pins to implement this novel hot docking sequence. Furthermore, hot undocking can be readily performed as well by basically reversing the docking sequence.

18 Claims, 7 Drawing Sheets

METHOD AND SYSTEM FOR HOT DOCKING A PORTABLE COMPUTER TO A DOCKING STATION VIA THE PRIMARY PCI BUS

TECHNICAL FIELD

The field of the present invention pertains to hot docking a portable computer into a docking station via the primary PCI bus.

BACKGROUND ART

Computers have become common place tools for professionals. They are invaluable for storing and processing large volumes of information and are often called upon to perform tasks involving calculations, statistics, graphics, computer-aided design, finances, business transactions, communications, etc. Indeed, computers have come to be ingrained in all facets of the workplace. However, as business needs dictate the travel requirements of today's professionals, there arose a need for a portable computer system. Hence, portable or "laptop" computers were developed to satisfy the demand for small, compact, and lightweight computer systems which could readily be carried and transported by an individual. These portable computers allowed professionals to bring their computers with them when traveling.

Although portable computer systems satisfied the demand for portability, their speed, power, storage capacity, and display functions were sacrificed in order to reduce its size and weight. Consequently, the portable computer was only used when portability became an issue. Otherwise, the standard desktop computer was the preferred computer system of choice. Hence, many professionals often have both a laptop computer as well as a traditional desktop computer. However, having two different computer systems had its own disadvantages. One serious problem related to file management. Since there exist two independent storage mediums—one per computer, there was a requirement to track the contents stored in each computer. A person would often wonder which computer had the latest copy. Another concern related to how the updating, copying, purging, and archiving of files were to be coordinated between the two computers.

A number of different solutions were attempted. One solution was to use a floppy disk to manually exchange and manage the files. This was a tedious, time-consuming, and generally error-prone method. An alternative solution was to use a software program to automate the copying and organizing process. This solution was often complicated due to the number of cables and software compatibility issues; it often created more problems than the portable computer solved. People found it was difficult to remember which computer had the latest information, or, whether files were current and contained their latest work.

To resolve these problems, a new solution was developed: the docking station. A docking computer is a portable computer/desktop computer solution whereby the portable computer retains its advantages of small size and weight, yet gains the full and robust features of a fully configured desktop system. Presently, the docking computer is in moderate use among professionals who frequently travel for business. It is estimated, however, that perhaps a majority of systems sold to mobile professionals will be portable computers with docking stations. The docking station is a device that enables a full-featured desktop environment at the office, while allowing the portability and convenience of a portable computer while traveling. The docking station essentially is the back plane and expansion slots of the desktop computer, while the CPU, DRAM and hard disk are part of the portable computing unit. This resolved the need for two computers as the computing and file information comes from only one computer—the portable computer.

Since the original docking station, there have been constant design challenges. The biggest challenge is to provide a docking system that is user-friendly and does not present information loss risk. The goal of docking computer devices is to allow the flexibility and portability of portable computers while providing the full featured robustness of desktop computers. In pursuit of this goal, three docking strategies have evolved: cold, warm and hot docking. Cold docking was the earliest of the docking systems. It consisted simply of turning off the portable computer and inserting it into or removing it from the docking station. This required the user to stop and restart/reinitialize (or reboot) the computer system each time the portable is inserted into the docking station, or removed from it. The user is required to have specific knowledge of the insert/remove and stop/reboot process.

Warm docking was developed to address some of the inherent limitations of the cold docking approach. In warm docking, the portable computer is set to a power managed state (in effect, neither on nor off) and inserted or removed from the docking station. Although the portable computer is not "off," it is operating in a reduced power state and is not functional to the user. In both cases, the system must be prepared by the user for the docking/undocking process in order to prevent data loss or damage to files stored on the system. Hot docking is the latest incarnation of the portable docking computer concept. Hot docking allows the insertion of a fully powered and operating portable computer into the docking station without concern about the state of the device's functional condition and the attendant worry of data loss or file corruption.

There are two ways to design a hot docking system in a PCI environment. The first involves the use of a PCI to PCI bridge on-board the computer device. The second method calls for a PCI to PCI bridge to be incorporated in the docking station. Referring to the first method, an on-board PCI to PCI bridge design incorporates the PCI to PCI bridge within the portable computer. With the on-board PCI to PCI bridge, the secondary PCI bus (i.e., the bus on the docking station) is isolated, and the portable computer system remains active (i.e., CPU and primary PCI cycles are allowed) during the docking process. The major disadvantage to this approach is that the PCI bridge and docking circuitry are located on-board the portable computer. This imposes a space, weight and cost penalty on the portable computer. In contrast, an off-board PCI to PCI bridge design moves the PCI to PCI bridge off of the portable computer and into the docking station. With the off-board PCI to PCI bridge, the primary PCI bus on the portable computer is extended through the docking connector and the PCI to PCI bridge provides the secondary bus within the docking station. With this design, the bridge chip and docking circuitry are located on the docking station, reducing weight, space and cost for the portable computer.

When designing either an on- or off- board bridge, not only must the PCI bus signals be isolated during docking and undocking, the ISA bus signals must also be properly isolated as well. Most portable computers today incorporate legacy ISA peripherals. In order to accommodate them, an ISA bus is provided on both the portable computer and the docking station. To join the ISA buses, the IRQ[15:1] signals on both devices must be isolated during docking. This is being accomplished through the use of external glue logic, such as Quick-switches, or through the open-standard serialized IRQ/data protocol.

Although the use of Quick switches to electrically isolate the primary PCI bus from the docking station is undoubtedly more advanced than turning off the portable computer or switching the portable computer to a "power-managed" state, what is desired is a method to connect a portable computer system to a docking station without the added expense and complexity of incorporating Quick-switches. What is desired is a design which supports cold, warm, and hot docking methods, while minimizing weight, space and cost of component switches and chips on the portable unit. Additionally, the portable unit should be able to dock and undock from the station without requiring the use of a PCI to PCI bridge in the portable unit itself.

The present invention offers one such solution that accomplishes all of the above goals. These and other advantages of the present invention will become apparent within discussions of the present invention herein.

DISCLOSURE OF THE INVENTION

The present invention pertains to a dockable computer system having a portable computer which can be docked into and undocked from a corresponding docking station. In the present invention, the portable computer may be inserted into or removed from the docking station without concern relating to the states of either the portable computer or of the docking station. Even while the portable computer is up and running, a direct connection to the primary PCI bus can be established during the docking process. This "hot docking" is performed without risk of any possible system damage, file damage, or data loss. This unique ability is made possible by adding four new pins implementing a novel hot docking sequence to prevent glitches from occurring in the pre-existing pins. Furthermore, hot undocking can be readily performed as well by basically reversing the hot docking sequence.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, numerous specific details are set forth in order to provide a thorough understanding of the present invention. It will be obvious to one skilled in the art, however, that the present invention may be practiced without these specific details. In other instances, well known methods, procedures, components, and circuits have not been described in detail as not to unnecessarily obscure aspects of the present invention.

Figure 1:
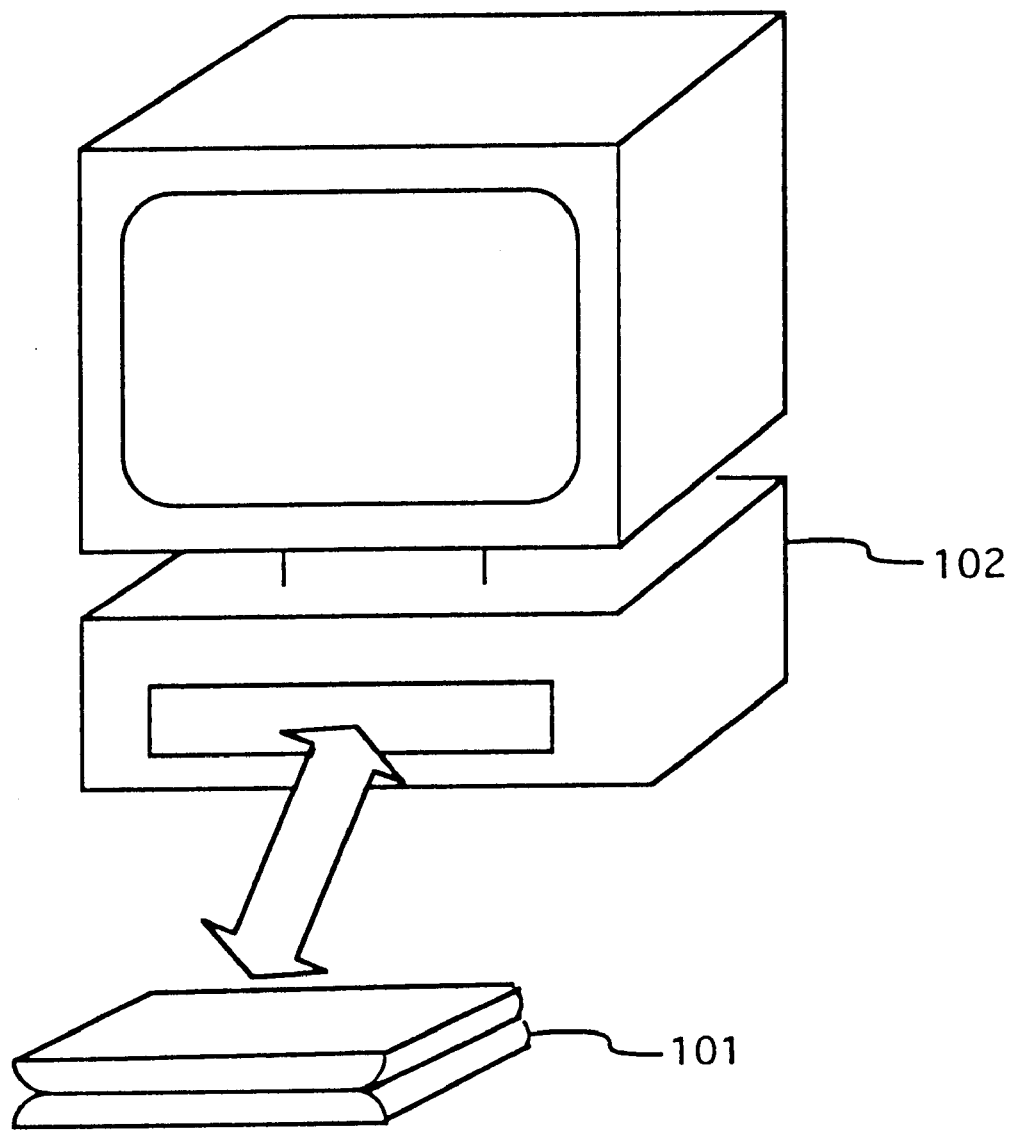
FIG. 1 shows a portable computer that can be docked and undocked to/from a docking station.

FIG. 1 shows a portable computer 101 that can be docked and undocked to/from the docking station 102. The primary bus hot docking sequence of the present invention is based on two fundamental concepts. The first concept is that during the docking sequence, the PCI clock is stopped low and all signals which go through the docking connector are tri-stated during the pin mating process. Since most of the PCI signals are only sampled on the rising edge of the PCI clock, PCI signals toggling or glitching during the docking sequence do not cause any problems. The second concept is that there is at least 100 uS of warning before the pin mating process begins. One method in which this can be accomplished is that a special hot docking pin and the ground pins on the docking connector are purposely made longer than the PCI signal pins. This pin would connect to the ground pins and short the pulled-up DOCK# pin in the notebook to ground. Potentially, the DOCK# pin would be required on both sides of the connector. Another alternative method is to use a proximity detector to indicate whether the notebook is about to dock.

Figure 2:
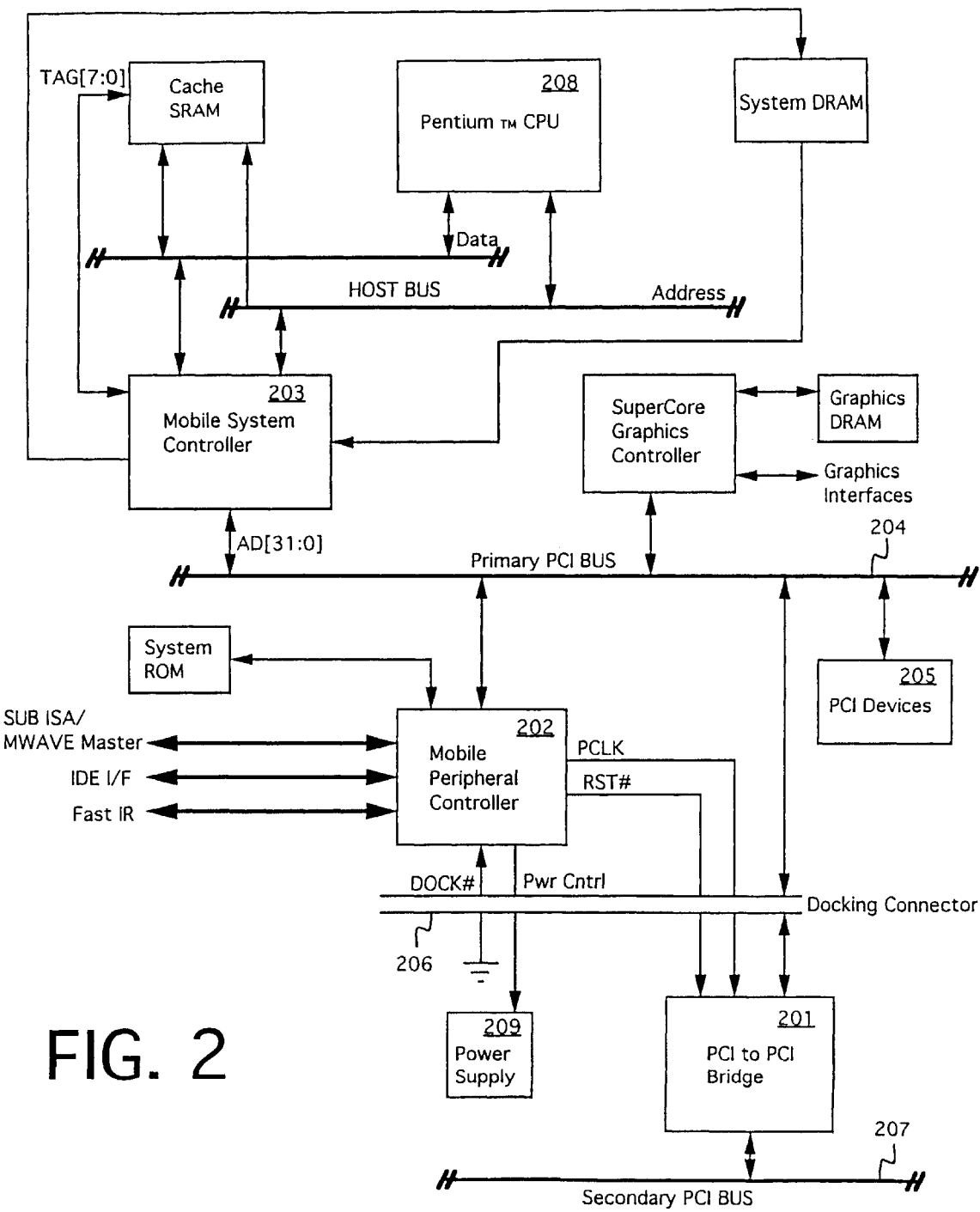
FIG. 2 shows a block diagram of the currently preferred embodiment of the present invention.

FIG. 2 shows a block diagram of the currently preferred embodiment of the present invention. During the docking sequence, the bridge 201 will be optionally powered, but held reset by a pull-down resistor (not shown). All of the signals on both sides of the docking connector are tri-stated. In the current PCI to PCI bridge pin definition, signals on the primary interface that are sampled on the rising edge of the PCI clock include AD[31:0], C/BE#[3:0], DEVSEL#, FRAME#, REQ#, IDSEL#, IRDY#, PAR, PERR#, SERR#, STOP#, LOCK#, TRDY# and IRQSER. Signals not sampled on the rising edge of the PCI clock include PCLK, CLKRUN# and RST#. The solutions for each of the signals which are not sampled on clock edges are discussed below.

PCLK: To avoid glitching from occurring to this signal during the docking sequence, a separate clock is provided from the Lynx Mobile Peripheral Controller 202 to the PCI to PCI bridge 201. This signal can be tri-stated during the docking/undocking sequence. This clock can be stopped and tri-stated under the direction of the Mobile Peripheral Controller 202.

RST#: To prevent glitches on the RST# pin from effecting PCI devices in the notebook during the docking/undocking sequence, there are two versions of the RST# signal. One version is used for the PCI devices 205 in the notebook on the primary PCI bus 204. The other RST# is used for the primary side of the PCI-to-PCI bridge in the docking station. If the docking interface in the docking station is powered when the notebook is undocked, this signal must be pulled down in the docking station so that the PCI-to-PCI bridge powers up in a reset state. The bridge 201 also tri-states all of its primary PCI signals when RST# is asserted. The RST# for the primary side of the PCI-to-PCI bridge can be tri-stated and controlled (asserted and deasserted) by the Mobile Peripheral Controller 202.

CLKRUN#: In the currently preferred embodiment, this signal is not connected to the primary side of the PCI-to-PCI bridge 201 in the docking station for two reasons. The first reason is that the PCI-to-PCI bridge can generate the secondary PCI clock from the primary PCI clock. If the primary clock starts and stops based on the PCI clock run protocol, the secondary PCI clock would also start and stop. This may not be desired, especially when the secondary bus is connected to PCI slot connectors. Since the PCI slot connectors cannot participate in a secondary PCI bus clock management protocol, the primary CLKRUN# signal must be continuously asserted to keep the secondary PCI clock running. The second reason is that if the CLKRUN# signal made a connection between the primary and secondary bus during the docking or undocking sequence, this signal could go active, but the primary PCI clocks will not start. This would be a violation of the Clock Run protocol. Hence, a pull-down resistor is attached to the PCI to PCI bridge's CLKRUN# pin. This keeps the CLKRUN# signal asserted. This implies that the clock run protocol must be disabled when the notebook is docked. It should be noted that when the bridge device is in the notebook, CLKRUN# is connected to the PCI to PCI bridge 201, thereby fully enabling the clock run protocol.

In addition to being sampled on the rising edge of the PCI clock, all of the PCI signals going through the PCI connector 206 is tri-stated during the docking/undocking sequence. After the Mobile Peripheral Controller 202 is notified that the system is about to dock/undock, it asserts a non-premptible request to the PCI central arbiter. After the central arbiter asserts the corresponding bus grant signal and the Mobile Peripheral Controller owns the PCI bus by detecting the PCI signals FRAME# and IRDY# deasserted, it tri-states its PCI signals. Note that the Mobile Peripheral Controller 203 will not be granted the PCI bus immediately but the worst case latency is much less than 100 uS available. Since it owns the PCI bus, the following PCI connector signals are guaranteed to be tri-stated in accordance with the specification: AD[31:0], C/BE#[3:0], DEVSEL#, FRAME#, IDSEL#, IRDY#, PAR, PERR#, STOP#, LOCK#, and TRDY#. Signals not tri-stated by the non-premptible request are given below:

IRQSER: To guarantee that this signal is tri-stated, a unique data frame called "docking" is generated. When the Serialized IRQ/Data host controller in the Mobile System Controller 203 detects this data frame, it switches the serial bus to a continuous mode if it is in quiet mode. The Serialized IRQ/Data host controller then goes into an idle or disabled mode. After the docking process is completed, system software may re-enable the serial bus. Note that if the serial bus is already in a disabled mode when the dock event occurs, then the dock request frame will not be able to be transmitted, but will instead continue to wait for a serial bus packet. When the docking process is finally completed, system software re-enables the serial bus. This allows the dock request frame to be transmitted to the central serial controller, which responds by switching to continuous mode and disabling the serial bus. This unintended effect leads to the requirement that the serial bus be in an active mode, either continuous or quiet, before the dock event occurs.

SERR#: When the PCI to PCI bridge 201 is in the docking station, this signal is not connected through connector 206. Instead, SERR# assertion on the secondary PCI bus 207 is converted to a serial bus data frame within the PCI to PCI bridge device. This data frame causes an NMI to be asserted to the CPU from the Mobile System Controller 203. One advantage this provides is that it saves a docking connector pin.

CREQ#: This signal connects directly to the Mobile System Controller 203 from the primary side of the PC to PCI Bridge 201. When the notebook is not docked, a pull-up resistor keeps this signal inactive. This signal is tri-stated during the docking process, since only the PCI to PCI bridge can drive this device.

CGNT#: This signal is normally driven by the Mobile System Controller 203 when the notebook is docked. When the notebook is undocked, this signal is tri-stated and pulled-up. Tri-state control is provided by a Mobile System Controller configuration register.

PCLK: This signal can be stopped and tri-stated by the Mobile Peripheral Controller (see above).

RST#: This signal can also be tri-stated by the Mobile Peripheral Controller (see above).

In addition, four pins are dedicated specifically for docking and undocking. Furthermore, general purpose input/output pins (GPIOs) are required, but the number depends on the OEM's specific system implementation. Note that it is assumed that the SERIRQ pin is a part of the PCI connector. A description of each of these four pins is given below:

DOCK#: This pin resides on the Mobile Peripheral Controller 202. It is used to indicate that the notebook is about to dock. It becomes active before the docking connection is made. It will most likely stay active until the notebook has undocked.

UNDOCK#: This pin also resides on the Mobile Peripheral Controller 202. It is used to indicate that the notebook is about to undock. It becomes active before the eject mechanism begins. It most likely will stay active until the notebook has docked. This pin could be coupled to a proximity switch or an eject request button. Note, that if the notebook undocking sequence is initialized by the operating system software in response to an operator request, this pin may not be required.

BDG_PPCLK: This signal is the PCI to PCI Bridge's primary PCI clock. This signal comes from the Lynx Mobile Peripheral Controller and can be tri-stated; enabled and stopped; or enabled and active.

BDG_PRST#: This signal is the PCI to PCI Bridge's primary reset. This signal comes from the Mobile Peripheral Controller 202 and can be tri-stated, driven low or driven high.

The power supply 209 considerations are now described. If the system is designed such that the power is off in the docking system until the notebook docks, care must be taken to insure that the power supplies for devices in the notebook do not go out of tolerance during the docking/undocking sequence. One method of achieving this is to turn on and turn off the power supply controller with a power supply control signal passed through on the docking connector to the power supply controller in the docking station. The power supply controller could control power to all devices in the docking station. Another method of achieving this is to have the power to core logic and primary side of the PCI to PCI bridge supplied by a separate FET from the notebook computer supply and controlled by the Mobile Peripheral Controller 202 . The secondary bus power would then be controlled by general purpose I/O (GPIO) pins accessed through PCI configuration registers.

Figure 3:
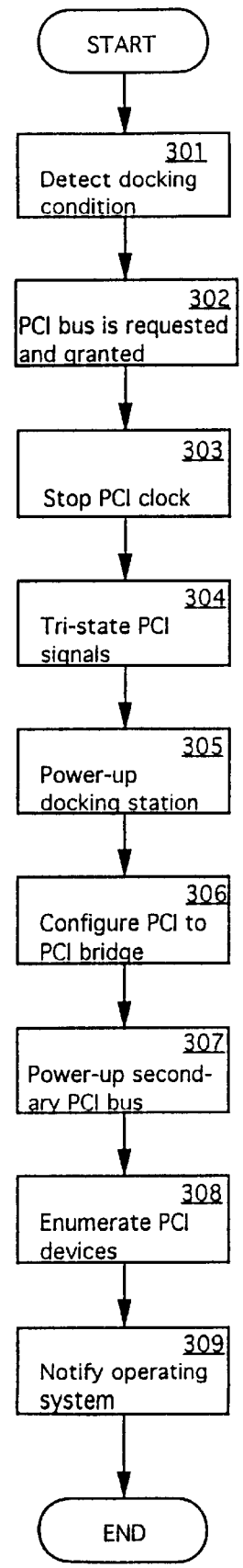
FIG. 3 is a flowchart describing the overall steps associated with a docking sequence according to the present invention.

The docking sequence is now described. FIG. 3 is a flowchart describing the overall steps associated with a docking sequence according to the present invention. The docking sequence involves a docking sequencer which is located in the Mobile Peripheral Controller, an embedded microcontroller, and the SMM handler. The docking sequencer is involved in the early stages of the docking sequence where real time response is required. The docking sequencer first detects the docking condition, step 301. The docking sequencer then prepares the system for the actual mating of the docking signal pins, steps 302–304. The microcontroller provides the ability to determine the docked condition through a GPIO and powers up the docking station (if required), step 305. It also controls the reset and clock to the PCI to PCI bridge. In addition, the docking sequencer notifies the SMM handler that the system has changed by generating an SMI#. The SMM handler performs the remaining steps 306–309 of the docking sequence. It configures the PCI to PCI bridge in step 306. Next, it powers on the secondary PCI bus, if required, step 305. And devices behind the PCI to PCI bridge are enumerated, step 306. The SMM handler also notifies the operating system of the new resources available, step 307.

Note that the method the docking sequencer prepares the notebook system for the actual mating of most of the docking pins is by three steps 302–304. In step 302, the PCI bus is requested and granted to the Mobile Peripheral Controller. Next, the PCI clock is stopped, step 303. Finally, the PCI signals are tri-stated, step 304. A problem arises if the MPC's PCI bus request is premptible. The docking sequencer cannot lose ownership of the PCI bus before the docking pins initiate connection. The solution to this problem is in the design of the primary PCI bus arbiter. It imposes the rule that once a device is granted the bus, it will not remove this grant until either that device's request is deasserted, or the device asserts FRAME#, thereby indicating the device will relinquish bus ownership at the conclusion of its current transaction.

Figure 4:
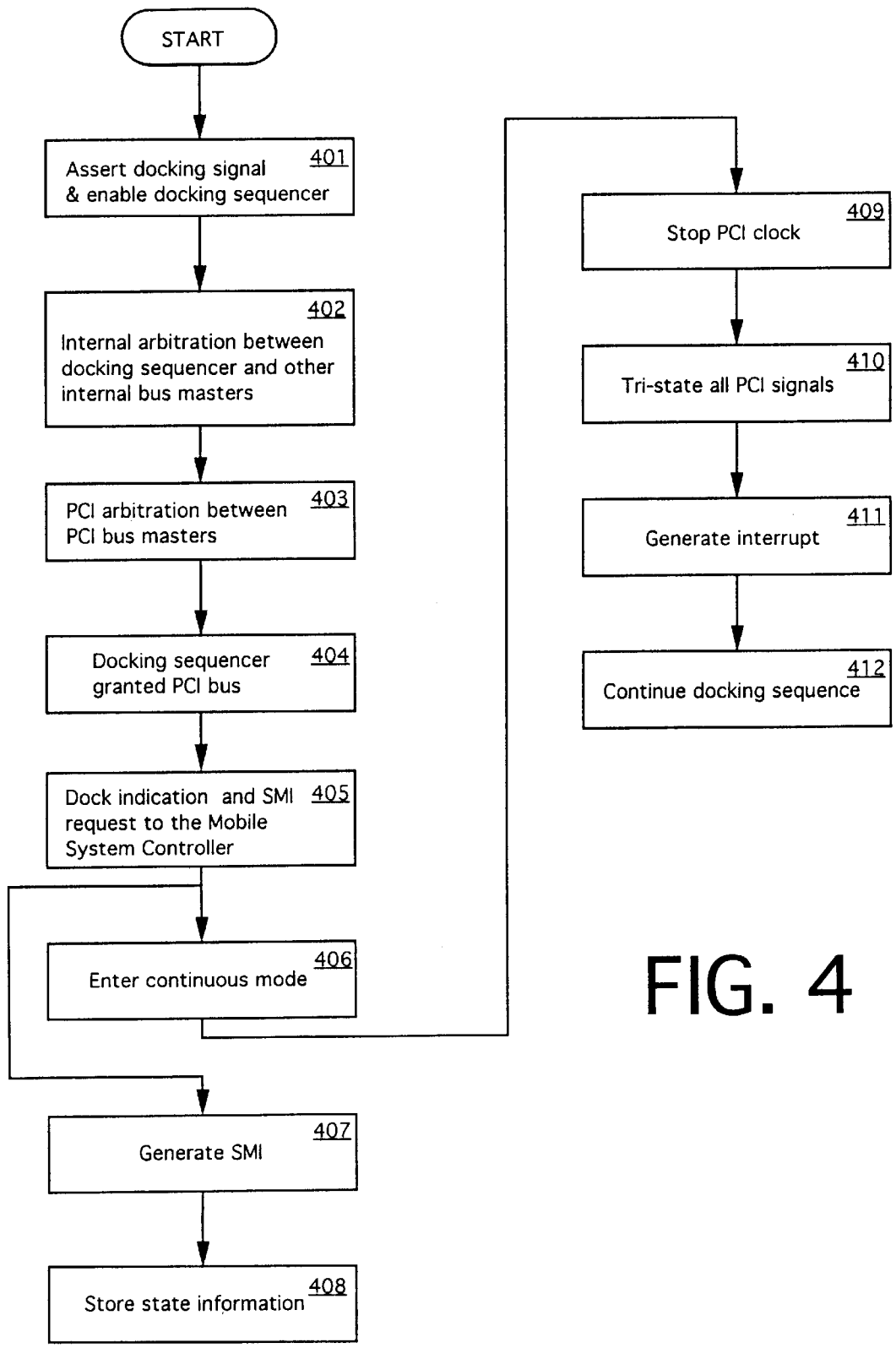
FIG. 4 shows a detailed flow chart of the steps relating to the initial docking sequence.

FIG. 4 shows a detailed flow chart of the steps relating to the initial docking sequence performed by the docking sequencer. Before starting this sequence, it is assumed that the microcontroller has tri-stated both the PCI clock and PCI reset coupled to the PCI to PCI bridge. The docking sequence begins with the assertion of the docking signal and the enabling of the docking sequencer, step 401. Furthermore, the clock run request is asserted to the CLK-RUN# controller. The PCI bus is requested and granted in steps 402–404. Note that first, an internal arbitration between the docking sequencer and other bus masters internal to the Mobile Peripheral Controller occurs, step 402. Then, a PCI arbitration between the requesting PCI bus masters occurs, step 403. The docking sequencer will be granted the PCI bus before the required 100 uS time limit expires, step 404. Thereupon, the dock indication is passed to the Mobile System Controller through the serial bus, step 405. This causes the Serialized IRQ/Data host controller to enter Continuous Mode and not generate any new Start Frames (IDLE), step 406. In addition, an SMI is generated using the serial bus, step 407. It should be noted that the SMI frame and dock frame must be passed in the same serial interrupt packet. Otherwise, the serial bus could be disabled before the SMI is passed through to the Mobile System Controller. Next, the CPU dumps its state to SMRAM step 408, but will not be able to execute any PCI cycles (e.g., configuration, memory or 10), since the PCI bus has been granted to the docking sequencer. In step 409, the PCI sequencer requests the PCI clock control block to stop the PCI clock and releases the clock run request. In response, the PCI clock logic stops the PCI clock and prevents the clock from starting. Once the PCI clock has stopped, all PCI signals controlled by the Mobile Peripheral Controller are tri-stated, step 410. An interrupt is then generated to the 8052 microcontroller, step 411.

Figure 5:
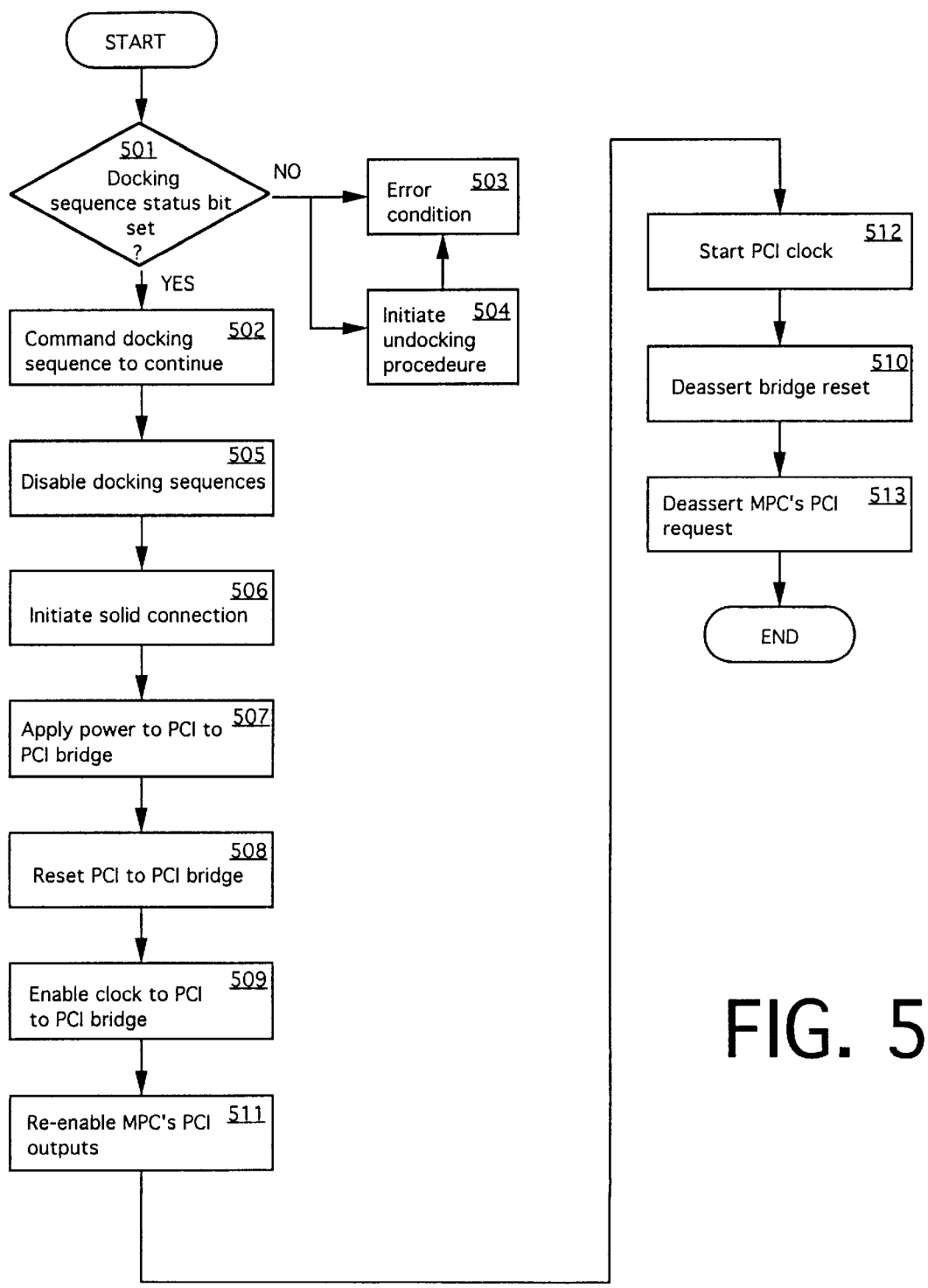
FIG. 5 is a flowchart describing the steps of one possible manner for continuing the docking sequence once an interrupt has been generated.

At this point, the 8052 microcontroller continues the docking sequence. FIG. 5 is a flowchart describing the steps of one possible manner for continuing the docking sequence once an interrupt has been generated. It should be noted that the following steps given below are but one example of many different methodologies which may be applied. The system designer can easily redefine the remaining docking steps according to their specific needs by using the 8052 microcontroller to continue the docking sequence. The 8052 microcontroller supports the remaining steps using the following information. First, a status bit is used to indicate whether the sequencer has completed its required steps. Second, a control bit to cause the sequencer to undock. Third, GPIO pins (general purpose input-output pins) are used to indicate the physical docking connections that are complete, to control power supplies, to control quick switch buffers, etc.

Referring to the flowchart of FIG. 5, if the system is designed such that the docking sequence does not proceed until it is safe to do so, the 8052 microcontroller can check the docking sequencer status bit, step 501. This bit indicates whether the docking sequencer has completed its required steps to determine whether it is safe to continue. The 8052 microcontroller then drives a GPIO to command the docking sequence to continue, step 502. If the status bit indicates that the PCI sequencer did not complete its docking sequence, the 8052 microcontroller drives a different GPIO in order to illuminate an LED, indicating an error condition, step 503. Alternatively, the 8052 microcontroller could command the docking sequencer to perform its undocking sequence, step 504.

If it is safe to continue the docking sequence, the docking sequencer is disabled, step 505. Thereupon, the 8052 microcontroller polls the state of a GPIO pin which is used to indicate that the docking connector has established a solid connection, step 506. One method to implement this is to pull-up the GPIO pin to a reference voltage and connect it to a docking connector pin which is shorter than the others and grounded. Next, a GPIO pin is used to turn on power to the PCI to PCI bridge's primary interface and core, step 507. The PCI to PCI bridge's PCI reset is then enabled and asserted, step 508. After which the PCI to PCI bridge's clock is enabled, step 509. After the power supply and clock have stabilized, the Mobile Peripheral Controller's PCI outputs are re-enabled, step 511. The PCI clock is started, step 512. After a 100 μsec delay, the PCI to PCI bridge's primary reset is deasserted, step 510. And finally, the Mobile Peripheral Controllers PCI request is deasserted, step 513.

Figure 6:
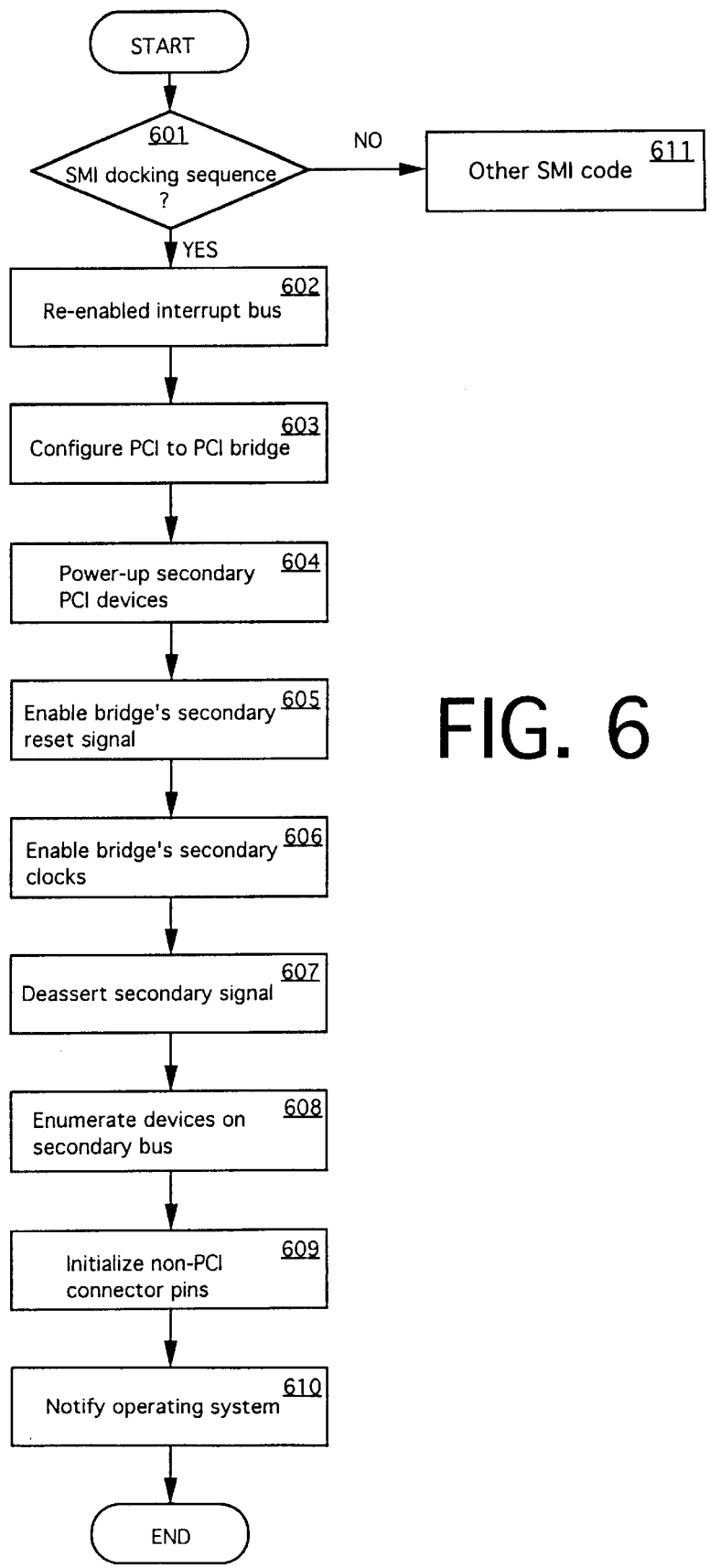
FIG. 6 is a flowchart describing the steps of the SMM handler for completing the docking sequence.

At this point, the SMM handler completes the final steps of the docking sequence as depicted by the flowchart of FIG. 6. In the first step 601, the CPU enters the SMM handler and determines that the docking sequence generated the SMI#. Otherwise, other SMI code is processed, step 611. The handler also re-enables the serial interrupt bus in the desired mode (e.g., continuous or quiet), step 602. Next, the PCI to PCI bridge is configured, step 603. Power is turned on to the PCI devices on the secondary bus, step 604. The PCI to PCI bridge's secondary reset signal is then enabled and asserted through the bridge's configuration register, step 605. In step 606, the PCI to PCI bridge's secondary clock signals are enabled through a PCI configuration register. At least 100 μsec later, the PCI to PCI bridge's secondary reset signal is deasserted through a PCI configuration register, step 607. Devices on the secondary bus are enumerated in step 608. Thereupon, the other non-PCI pins of the docking connector are initialized (USB, keyboard, mouse, etc.), step 609. Lastly, the SMA handler notifies the operating system of the change in the available resources in the system, step 610.

Figure 7:
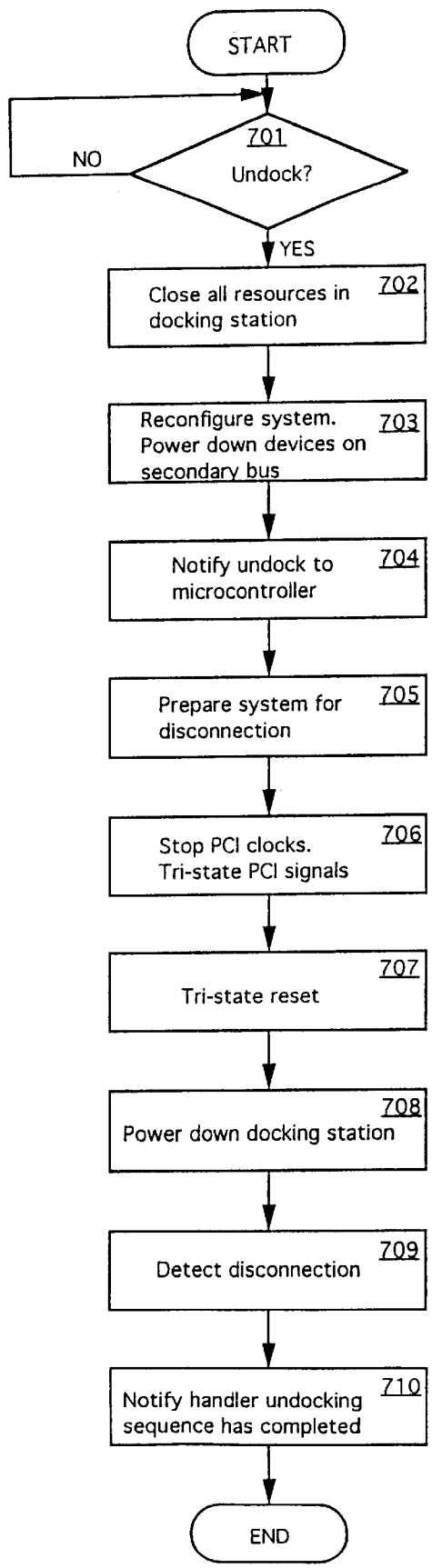
FIG. 7 is a flowchart showing the steps for the undocking sequence.

FIG. 7 is a flowchart showing the steps for the undocking sequence. The undocking sequence is very similar to the docking sequence, except in the reverse order. It is assumed that the notebook will not be removed from the docking station until the operating system has closed the appropriate files. Alternatively, a mechanism to accommodate "Surprise" type undockings can be implemented. The SMM handler and the 8052 microcontroller are the primary components involved since there are no real time requirements the undocking sequence must satisfy. The undocking sequence begins, in step 701, when the UNDOCK# pin asserts to indicate that the notebook is about to undock. This generates an SMI# signal and causes the CPU to enter the SMM handler. First, the SMM handler notifies the operating system to close all resources in the docking station, step 702. Next, the SMM handler re configures the system and turns off power to devices on the secondary bus (if required), step 703. Finally, it communicates to the 8052 microcontroller that system undock is eminent, step 704. The 8052 microcontroller prepares the system for the actual disconnection, step 705. Once this sequence is completed, PCI clocks are stopped and the PCI signals are tri-stated, step 706. The 8052 tri-states the reset and clock to the PCI to PCI bridge, powers down the dock (if required), and detects when the system is cleanly undocked, steps 707–709. The 8052 microcontroller then notifies the SMM handler that the notebook has completed its undocking sequence, step 710.

A detailed example of an undocking sequence is given below. Note that the steps given below are offered only as an example and that other modifications can be made. In a manner similar to the docking sequence, the 8052 microcontroller provides the flexibility to customize the remaining undocking steps to the system's design specific requirements. Before starting this sequence, the UNDOCK# pin is configured to generate an SMI#, the UNDOCK# pin is active, and the corresponding SMI# causes the CPU to enter the SMM handler. The CPU determines that the UNDOCK# pin generated the SMI#. The SMM handler notifies the operating system that the notebook is undocking. The operating system closes secondary PCI resources. The other non-PCI pins of the docking connector are prepared for the undocking sequence (USB, keyboard, mouse, etc.). The PCI to PCI bridge's secondary reset signal is asserted through the bridge's configuration register. The PCI to PCI bridge's secondary clock signal is stopped through a PCI configuration register. Power is turned off to the PCI devices on the secondary bus. The SMM handler passes the resource change information to the operating system so that it only uses the peripherals available in the notebook. The host controller mode for the serial bus is changed from Quiet to Continuous and then disabled. The microcontroller is notified that the system is undocking through a mailbox interface.

At this point, the microcontroller takes control of the undocking sequence. The Mobile Peripheral Controller's PCI request is asserted. When the bus is granted, the PCI to PCI bridge's PCI reset is enabled and asserted. The PCI clock is stopped. Most likely, the PCI clock will already be stopped since there will not be any PCI bus activity. However, if the clock run protocol has been disabled during docking and the PCI clock is still running, it will be stopped. The Mobile Peripheral Controllers PCI outputs are three stated. The PCI to PCI bridge's clock and reset are three stated. A GPIO pin is used to turn off power to the PCI to PCI bridge's primary interface and core. The docking system is notified that notebook can now be disconnected. The microcontroller polls on a GPIO which is used to indicate that the docking connector has cleanly disconnected. The Mobile Peripheral Controller's PCI outputs are re-enabled. The PCI clock is started. The Mobile Peripheral Controller's PCI request is deasserted. The microcontroller notifies the CPU that the notebook has undocked through the mailbox interface. The CPU re-enables the serial bus and changes the mode from Continuous back to Quiet.

Alternative embodiments of the present invention are now described. The docking and undocking sequences described above are based on the assumption that the notebook system is in a fully powered up state. The notebook user may attempt to dock while the notebook is in one of the following states: Suspend-to-RAM, Suspend-to-Disk, Clock Division Emulation Run, Clock Emulation Clock Division Emulation Stop, Standby, Off, or Dead. The impact of docking when the notebook is in these various power management states are described in detail below.

Suspend-to-RAM: The sequencer is involved in the docking sequence. The sequencer uses 32 kHz as a clock frequency. Before the system Suspends-to-RAM, the MPC (Mobile Peripheral Controller) requests and is given ownership of the PCI bus. Therefore, when the DOCK# signal indicates that the system is docking, the only real-time action required is that the PCI bus is tri-stated. The microcontroller is interrupted so that it can continue the rest of the docking sequence. If the notebook is undocking, the microcontroller can be interrupted by the UNDOCK# signal and performs the required undocking sequence steps.

Suspend-to-Disk: Since the PCI bus is already off in the notebook and the docking station, the notebook can safely dock or undock. When the system resumes normal operation, the CPU determines whether there was a change in the docking status and takes the appropriate actions.

Off or Dead: Since power is already off in the notebook and docking station, the notebook can safely dock or undock without any action on the part of the system.

Clock Division Emulation Run, Clock Division Emulation Stop or Standby: When docking, initially only the sequencer and microcontroller are required. Once the SMI# is generated, the CPU enters the SMM handler in the Full On state. The undocking sequence begins when the UNDOCK# pin generates an SMI#. This also causes the CPU to enter the SMM handler in the Full On state.

Hot docking without a PCI to PCI bridge is now described. For docking systems that only have a few PCI devices, hot docking is still available. One example of where this can be used is in a port expander type docking system. Due to the expense of the docking connector, it is more cost effective to pass the PCI bus through the docking connector and include a peripheral controller in the dock rather than pass all of the peripheral controller signals through the docking connector. Another example of where this may be used is in a multi-media type docking system. The sequence provided by the Mobile System fully supports primary bus hot docking to these type of docking systems.

The preferred embodiment of the present invention, a notebook computer hot docking station, is thus described. While the present invention has bee described in particular embodiments, it should be appreciated that the present invention should not be construed as limited by such embodiments, but rather construed according to the below claims.

What is claimed is:

1. An apparatus for hot docking a portable computer with a docking station through a primary PCI bus, comprising:
   a docking sequencer coupled to the primary PCI bus for detecting a docking condition and preparing the portable computer and docking station for mating of docking signal pins;

a PCI to PCI bridge for exchanging signals between the primary PCI bus of the docking station and a secondary PCI bus of the portable computer;

a connector for detachably coupling the PCI to PCI bridge to the primary PCI bus;

a controller coupled to the primary PCI bus for generating reset and clock signals to the PCI to PCI bridge, wherein signals including address, C/BE, DEVSEL, FRAME, REQ, IDSEL, IRDY, PAR, PERR, SERR, STOP, LOCK, TRDY, and an IRQSER (serialized interrupt request) signal are tri-stated during the mating of the docking signal pins, and wherein the clock signal from the controller to the PCI to PCI bridge is tri-stated during a docking sequence; and a handler coupled to the controller for configuring the PCI to PCI bridge, identifying devices coupled to the PCI to PCI bridge, and notifying an operating system of additional resources when the portable computer is docked.

2. The apparatus of claim 1, wherein the docking signal pins are comprised of:

a first pin for indicating that the portable computer is about to dock;

a second pin to indicate that the portable computer is about to undock;

a third pin that provides the PCI to PCI bridge with a primary PCI clock, wherein the clock can be tri-stated, enable and stopped, or enabled and active;

a fourth pin for providing a reset signal which can be tri-stated, driven low, or driven high.

3. The apparatus of claim 2, wherein when the second pin indicates that the portable computer is to be undocked, the handler notifies the operating system to close resources associated with the docking station and the controller stops a PCI clock, three-states PCI signals, and three-states a reset signal and a clock signal to the PCI to PCI bridge.

4. The apparatus of claim 1 further comprising an arbiter coupled to the primary PCI bus, wherein the arbiter generates a grant signal to grant ownership of the primary PCI bus and does not remove the grant signal until a requesting device signals the start of a transaction on the primary PCI bus, in order to insure that the controller maintains the primary PCI bus ownership until final contact between the docking connector and the docking receiver is established.

5. The apparatus of claim 1, wherein the reset signal is pulled down to reset the PCI to PCI bridge which causes PCI signals associated with the PCI to PCI bridge to become tri-stated.

6. The apparatus of claim 1 further comprising a pull-down resistor to keep a clock run signal asserted during a docking sequence.

7. The apparatus of claim 1 further comprising a docking data frame to switch a serial bus to a continuous mode of operation in order to tri-state the IRQSER signal.

8. The apparatus of claim 1 further comprising a pull-up resistor coupled to the SERR pin on the primary PCI interface of the PCI to PCI bridge and the bridge, which converts the SERR signal on a secondary PCI bus to a serial bus data frame.

9. In a computer system having a portable computer that is dockable with a docking station, a method for hot docking the portable computer with the docking station through a primary PCI bus, comprising the steps of:

detecting a docking condition and preparing the portable computer and docking station for mating of docking signal pins;

exchanging signals between the primary PCI bus of the docking station and a secondary PCI bus of the portable computer;

generating reset and clock signals from a controller to the PCI to PCI bridge, wherein signals including address, C/BE, DEVSEL, FRAME, REQ, IDSEL, IRDY, PAR, PERR, SERR, STOP, LOCK, and TRDY are tri-stated during the mating of the docking signal pins;

asserting the reset signal to reset the PCI to PCI bridge, wherein the reset PCI to PCI bridge causes PCI signals associated with the PCI to PCI bridge to become tri-stated;

tri-stating the clock signal from the controller to the PCI to PCI bridge during a docking sequence; and configuring the PCI to PCI bridge, identifying devices coupled to the PCI to PCI bridge, and notifying an operating system of additional resources when the portable computer is docked.

10. The method of claim 9 further comprising the steps of:

indicating through a first pin that the portable computer is about to dock;

indicating through a second pin that the portable computer is about to undock;

providing the PCI to PCI bridge with a primary PCI clock through a third pin, wherein the clock can be three-stated, enable and stopped, or enabled and active;

providing a reset signal through a fourth pin, wherein the reset signal can be three-stated, driven low, or driven high.

11. The method of claim 10, wherein when the second pin indicates that the portable computer is to be undocked, the operating system closes resources associated with the docking station and the controller stops a PCI clock, three-states PCI signals, and three states a reset signal and a clock signal to the PCI to PCI bridge.

12. The method of claim 9 further comprising the step of tri-stating an IRQSER (serialized interrupt request) signal during the mating of docking signal pins.

13. The method of claim 12 further comprising the step of asserting a clock run signal when the portable computer is docked.

14. The method of claim 12 further comprising the step of generating a docking data frame to switch a serial bus to a continuous mode of operation in order to tri-state the IRQSER signal.

15. The method of claim 14, wherein the step of notifying a system management module handler that the system resources have changed, is further comprised of:

notifying a system management module handler by generating a system management interrupt signal;

configuring the PCI to PCI bridge, and;

enumerating the devices behind the PCI to PCI bridge.

16. The method of claim 12 further comprising the step of converting the SERR signal on a secondary PCI bus to a serial bus data frame.

17. The method of claim 9 further comprising the step of an arbiter generating a grant signal to grant ownership of the primary PCI bus, wherein the grant signal is not removed until a requesting device indicates the start of a transaction on the primary PCI bus, in order to insure that the controller maintains the primary PCI bus ownership until final contact between the docking connector and the docking receiver is established.

18. In a computer system having a docking station and a portable computer, a method for unmating a docking connector on the portable computer and a docking receiver on the docking station comprising the steps of:

asserting an undock signal to indicate that the portable computer is preparing to undock, wherein said undock signal is the result of a user request to the portable computer's operating system that the portable computer be undocked, or ejected, from the docking station;

closing all open files and resources in the docking computer;

turning off power to any devices on a secondary bus;

stopping a primary PCI clock in the portable computer, stopping a PCI to PCI bridge secondary clock in the docking station, and tri-stating outputs including the signals C/BE, DEVSEL, FRAME, REQ, IDSEL, IRDY, PAR, PERR, SERR, STOP, LOCK, TRDY, and IRQSER (serialized interrupt request);

turning power off to the docking station, and;

detecting when the docking connector and the docking receiver have cleanly detached.

* * * * *